(12) United States Patent
Matsunaga et al.

(10) Patent No.: US 8,978,367 B2
(45) Date of Patent: Mar. 17, 2015

(54) EXHAUST GAS PURIFYING SYSTEM OF INTERNAL COMBUSTION ENGINE

(71) Applicant: Honda Motor Co., Ltd., Tokyo (JP)

(72) Inventors: Hideki Matsunaga, Wako (JP); Yuji Yasui, Wako (JP); Naohiro Sato, Wako (JP); Masafumi Sakota, Wako (JP); Eiji Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 13/905,565

(22) Filed: May 30, 2013

(65) Prior Publication Data

US 2013/0318949 A1 Dec. 5, 2013

(30) Foreign Application Priority Data

May 31, 2012 (JP) .................................. 2012-125448

(51) Int. Cl.
*F01N 3/00* (2006.01)
*F01N 3/10* (2006.01)
(Continued)

(52) U.S. Cl.
CPC ................. *F01N 3/10* (2013.01); *F01N 3/0814* (2013.01); *F01N 3/0842* (2013.01); *F01N 3/101* (2013.01);
(Continued)

(58) Field of Classification Search
CPC ..... F01N 3/2066; F01N 3/0842; F01N 3/035; F01N 13/02; F01N 2610/02; F01N 2610/03; F02D 41/0275; F02D 41/1441; F02D 41/0295; F02D 41/029
USPC .............................. 60/274, 285, 286, 295, 301
See application file for complete search history.

(56) References Cited

U.S. PATENT DOCUMENTS

| 2008/0306673 | A1 | 12/2008 | Yasui et al. | |
|---|---|---|---|---|
| 2011/0041480 | A1 | 2/2011 | Yasui et al. | |
| 2012/0004825 | A1* | 1/2012 | Koch et al. | 701/103 |
| 2012/0060472 | A1* | 3/2012 | Li et al. | 60/274 |
| 2012/0117954 | A1* | 5/2012 | Yasui et al. | 60/301 |
| 2012/0255286 | A1* | 10/2012 | Matsunaga et al. | 60/287 |
| 2013/0074474 | A1* | 3/2013 | Gonze et al. | 60/274 |
| 2013/0091826 | A1* | 4/2013 | Gonze et al. | 60/274 |

FOREIGN PATENT DOCUMENTS

| EP | 2 295 750 A1 | 3/2011 |
|---|---|---|
| EP | 2 320 043 A1 | 5/2011 |

(Continued)

OTHER PUBLICATIONS

German Search Report application No. 102013210120.1 mailed Oct. 1, 2013.

*Primary Examiner* — Thomas Denion
*Assistant Examiner* — Patrick Maines
(74) *Attorney, Agent, or Firm* — Squire Patton Boggs (US) LLP

(57) ABSTRACT

An exhaust gas purifying system includes: a SCR catalyst which has a function of reducing NOx and absorbing $NO_2$; an upstream catalyst which is provided at the upstream side of the SCR catalyst and has a three-way purification function; and an air-fuel ratio controller which controls the air-fuel ratio of the air-fuel mixture. The controller calculates the $NO_2$ storage amount of the SCR catalyst (S2), calculates a value of the NOx correlation parameter that increases in response to the NOx discharge amount (S4), sets the stoichiometry determination threshold value to a small value as the $NO_2$ storage amount increases (S5), and changes the operation mode of the engine to the stoichiometry operation mode in which the air-fuel ratio is controlled to stoichiometry when the value of the NOx correlation parameter is larger than the stoichiometry determination threshold value (S6, S9).

12 Claims, 8 Drawing Sheets

(51) Int. Cl.

| | |
|---|---|
| *F02D 41/02* | (2006.01) |
| *F02D 41/14* | (2006.01) |
| *F01N 13/00* | (2010.01) |
| *F01N 3/08* | (2006.01) |
| *F01N 3/20* | (2006.01) |
| *F01N 3/035* | (2006.01) |

(52) U.S. Cl.
CPC ........... *F01N 3/2066* (2013.01); *F02D 41/0275* (2013.01); *F01N 3/035* (2013.01); *F02D 41/1465* (2013.01); *F02D 2200/0806* (2013.01); *Y02T 10/22* (2013.01); *F01N 13/009* (2014.06)

USPC .................... 60/295; 60/301; 60/285; 60/286

(56) References Cited

FOREIGN PATENT DOCUMENTS

| | | |
|---|---|---|
| JP | 2008-002065 A | 1/2008 |
| JP | 2008-303842 A | 12/2008 |
| JP | 2009-293585 A | 12/2009 |
| WO | 2008/057628 A2 | 5/2008 |
| WO | 2009/128169 A1 | 10/2009 |
| WO | WO-2013127502 * | 9/2013 |

* cited by examiner

EXHAUST GAS PURIFYING SYSTEM OF INTERNAL COMBUSTION ENGINE

This application is based on and claims the benefit of priority from Japanese Patent Application No. 2012-125448, filed on 31 May 2012, the content of which is incorporated herein by reference.

BACKGROUND OF THE INVENTION

1. Field of the Invention

The present invention relates to an exhaust gas purifying system of an internal combustion engine. More specifically, the invention relates to an exhaust gas purifying system that includes a selective reduction catalyst for reducing NOx under the presence of $NH_3$.

2. Related Art

Hitherto, as one of exhaust gas purifying systems that purifies NOx in an exhaust gas, a configuration is proposed in which an exhaust passageway is provided with a selective reduction catalyst that selectively reduces NOx in an exhaust gas by a reducing agent such as ammonia ($NH_3$) (for example, see Patent Document 1). For example, in a urea addition type exhaust gas purifying system, urea water as a precursor of $NH_3$ is supplied from the upstream side of a selective reduction catalyst, $NH_3$ is produced from the urea water by heat degradation or hydrolytic degradation using the heat of the exhaust gas, and thus NOx in the exhaust gas is selectively reduced by the $NH_3$. In addition to such a urea addition type system, for example, a system is also proposed which produces $NH_3$ by heating a compound of $NH_3$ such as ammonia carbide and directly adds $NH_3$ to a subject.

In many cases, the selective reduction catalyst is used in an exhaust gas purifying system of an engine such as a lean combustion type gasoline engine or diesel engine operated based on lean combustion in which the air-fuel ratio of the air-fuel mixture is set to be leaner than stoichiometry so as to exhibit high NOx purification performance under the presence of an exhaust gas of a lean air-fuel ratio containing a large amount of oxygen. However, in an acceleration operation in which a NOx discharge amount increases, there is a case in which NOx may not be sufficiently purified only by the selective reduction catalyst. Therefore, as in the system disclosed in Patent Document 2, it is considered that NOx is purified by using a three-way purification reaction in a three-way catalyst provided at the upstream side of the selective reduction catalyst during the acceleration operation. According to the exhaust gas purifying system of Patent Document 2, in the system in which the three-way catalyst is provided at the upstream side of the NOx absorption-reduction catalyst, the air-fuel ratio of the air-fuel mixture is changed from the lean side to the stoichiometry in order to use the three-way purification reaction in the three-way catalyst during the acceleration operation.

Patent Document 1: Japanese Unexamined Patent Application, Publication No. 2008-2065
Patent Document 2: Japanese Unexamined Patent Application, Publication No. 2009-293585

SUMMARY OF THE INVENTION

Incidentally, in the selective reduction catalyst, a NOx reducing reaction occurs by using $NH_3$ as a reducing agent. However, even when a sufficient amount of $NH_3$ exists, a reaction that reduces only NO does not occur under the stoichiometry atmosphere where oxygen substantially does not exist. Further, since NO is a major element in NOx discharged from an internal combustion engine after the warming-up time, $NO_2$ of the exhaust gas which flows into the selective reduction catalyst is mainly produced by an oxidization reaction of NO in the upstream side three-way catalyst. Accordingly, in the system in which the three-way catalyst is provided at the upstream side of the selective reduction catalyst, when the air-fuel ratio of the air-fuel mixture is set to stoichiometry, both oxygen and $NO_2$ substantially do not flow into the selective reduction catalyst. For this reason, there is a concern that the NOx purification rate in the selective reduction catalyst may be degraded.

The invention is made in view of the above-described circumstances, and it is an objective of the invention to provide an exhaust gas purifying system capable of controlling an air-fuel ratio to stoichiometry at an appropriate timing so that an NOx purification rate in a selective reduction catalyst is not degraded.

(1) An exhaust gas purifying system of an internal combustion engine (for example, an engine 1 to be described later) of the invention includes: a selective reduction catalyst (for example, a SCR catalyst of a downstream catalyst converter 33 to be described later) which is provided in an exhaust passageway (for example, an exhaust passageway 11 to be described later) of an internal combustion engine and has a function of reducing NOx under the presence of $NH_3$ and absorbing any one of or both $NO_2$ and a $NO_2$ compound in an exhaust gas; a reducing agent supply device (for example, a urea water supply device 4 to be described later) which supplies $NH_3$ or its precursor to the selective reduction catalyst; an upstream catalyst (for example, an upstream catalyst of an upstream catalyst converter 31 to be described later) which is provided at the upstream side of the selective reduction catalyst in the exhaust passageway and has a three-way purification function; a NOx correlation value calculating unit (for example, a unit involved with the execution of S4 of FIG. 3 and an air-fuel ratio controller 61 to be described later) which calculates the value of the NOx correlation parameter that increases in response to the NOx discharge amount of the engine; an air-fuel ratio control unit (for example, the air-fuel ratio controller 61 to be described later) which controls the air-fuel ratio of the air-fuel mixture to stoichiometry when a value of the NOx correlation parameter is larger than a stoichiometry determination threshold value; a $NO_2$ storage amount estimating unit (for example, a unit involved with the execution of S2 of FIG. 3 and the air-fuel ratio controller 61 to be described later) which calculates the $NO_2$ storage amount corresponding to the amount of $NO_2$ and the $NO_2$ compound absorbed in the selective reduction catalyst; and a threshold value setting unit (for example, a unit involved with the execution of S5 of FIG. 3 and the air-fuel ratio controller 61 to be described later) which sets the stoichiometry determination threshold value to a small value as the $NO_2$ storage amount increases.

(1) In the invention, when the value of the NOx correlation parameter increasing in response to the NOx discharge amount is larger than the stoichiometry determination threshold value, the air-fuel ratio of the air-fuel mixture is controlled to the stoichiometry in order to purify NOx by the three-way purification reaction of the upstream catalyst. Here, when the air-fuel ratio of the air-fuel mixture is controlled to the stoichiometry, the amount of the oxygen and $NO_2$ which newly flows into the selective reduction catalyst decreases. However, even when the selective reduction catalyst becomes the stoichiometry atmosphere, a Fast-SCR reaction occurs by using $NO_2$ or a $NO_2$ compound absorbed so far. For this reason, it is possible to suppress considerable degradation in the NOx purification rate of the selective reduction catalyst.

That is, according to the invention, even when the air-fuel ratio is controlled to the stoichiometry, NOx may be purified by both the upstream catalyst and the selective reduction catalyst. Further, it is possible to improve the NOx purification rate under the stoichiometry atmosphere as the $NO_2$ storage amount of the selective reduction catalyst increases. For this reason, in the invention, the air-fuel ratio is actively changed to the stoichiometry by setting the stoichiometry determination threshold value to a small value as the $NO_2$ storage amount increases. Thus, according to the invention, the air-fuel ratio may be controlled to the stoichiometry at an appropriate timing so that the NOx purification rate of the selective reduction catalyst is not degraded.

Furthermore, the $NO_2$ compound substantially having the same function as that of $NO_2$ and absorbed to the selective reduction catalyst in this way specifically indicates, for example, ammonium nitrate ($NH_4NO_3$) as a compound of $NO_2$ and $NH_3$. The ammonium nitrate is produced from $NO_2$ and $NH_3$ (production formula: $2NO_2+2NH_3 \rightarrow NH_4NO_3 + N_2+H_2O$). Further, the ammonium nitrate is degraded by the reaction with NO (reaction formula: $NH_4NO_3+NO \rightarrow NO_2+N_2+2H_2O$). The actual selective reduction catalyst may absorb not only $NO_2$ but also a $NO_2$ compound, but these elements substantially have the same function. Thus, in the description below, the absorption of $NO_2$ and a $NO_2$ compound to the selective reduction catalyst is generally regarded as the absorption to $NO_2$ without clearly distinguishing $NO_2$ and a $NO_2$ compound. That is, the $NO_2$ compound which is absorbed to the selective reduction catalyst is generally regarded as $NO_2$.

(2) In this case, the air-fuel ratio control unit may preferably control the air-fuel ratio of the air-fuel mixture at a value leaner than the stoichiometry so that a NOx reducing reaction steadily occurs in the selective reduction catalyst when the value of the NOx correlation parameter is the stoichiometry determination threshold value or less.

(2) In the invention, when the value of the NOx correlation parameter is the stoichiometry determination threshold value or less and NOx may be sufficiently purified only by the NOx reducing reaction in the selective reduction catalyst without using the three-way purification reaction in the upstream catalyst, the air-fuel ratio of the air-fuel mixture is controlled at a value leaner than the stoichiometry. Therefore, it is possible to suppress the degradation of the fuel efficiency due to the change of the air-fuel ratio to the stoichiometry more than necessary.

(3) In this case, preferably, the exhaust gas purifying system may further include a temperature acquiring unit (for example, an exhaust gas temperature sensor 36 and an ECU 6 to be described later) which acquires the temperature of the selective reduction catalyst, wherein when the temperature of the selective reduction catalyst is lower than its activation temperature, the threshold value setting unit may set the stoichiometry determination threshold value to a small value compared to a case where the temperature of the selective reduction catalyst is higher than its activation temperature.

(3) When the temperature of the selective reduction catalyst is lower than the activation temperature, the NOx purification performance is degraded compared to a case where the temperature of the selective reduction catalyst is higher than the activation temperature. In the invention, when the temperature of the selective reduction catalyst is lower than its activation temperature, the stoichiometry determination threshold value is set to a small value compared to a case where the temperature of the selective reduction catalyst is higher than its activation temperature, so that the air-fuel ratio is actively changed to the stoichiometry. Therefore, it is possible to improve the NOx purification performance of the entire system by causing the three-way purification reaction of the upstream catalyst to take place with appropriate timing.

(4) In this case, the exhaust passageway may be provided with a filter (for example, an exhaust gas purifying filter 32 to be described later) which traps a particulate matter in the exhaust gas, and the air-fuel ratio control unit may preferably shorten the time in which the air-fuel ratio of the air-fuel mixture is maintained at the stoichiometry as the deposited amount of the particulate matter of the filter increases.

(4) When the air-fuel ratio is controlled to the stoichiometry, the more particulate matter is deposited compared to a case of control to the lean side. Therefore, in the invention, since the time in which the air-fuel ratio is maintained at the stoichiometry is shortened as the deposited amount of the particulate matter increases, the allowable depositing capacity of the filter may be ensured, and the excessive temperature of the filter may be prevented.

(5) In this case, the air-fuel ratio control unit may preferably prohibit the control to the stoichiometry of the air-fuel ratio in a case where the deposited amount of the particulate matter of the filter is larger than the upper-limit depositing amount that is set to prevent the excessive temperature of the filter when the air-fuel ratio of the air-fuel mixture is controlled to the stoichiometry.

(5) When the air-fuel ratio is controlled to the stoichiometry while the particulate matter is excessively deposited on the filter, there is a case in which the particulate matter burns and the temperature of the filter reaches the excessive temperature. According to the invention, since the air-fuel ratio is not controlled to the stoichiometry when the deposited amount is larger than the upper-limit depositing amount, it is possible to prevent the excessive temperature of the filter.

DETAILED DESCRIPTION OF THE INVENTION

Figure 1:
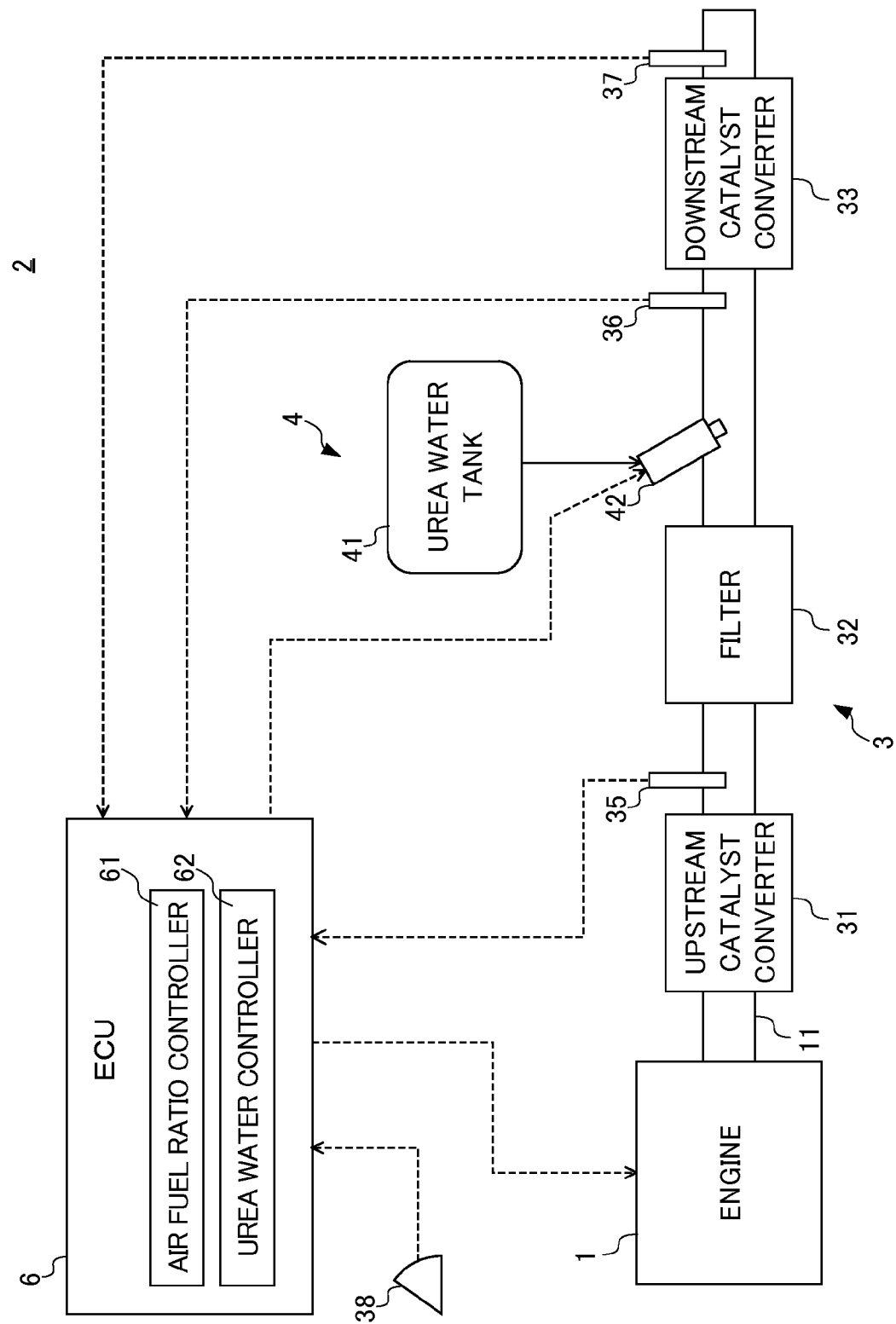
FIG. 1 is a schematic diagram illustrating configurations of an engine and its exhaust gas purifying system according to an embodiment of the invention.

Hereinafter, an embodiment of the invention will be described by referring to the drawings.

FIG. 1 is a schematic diagram illustrating configurations of an internal combustion engine (hereinafter, referred to as an "engine") 1 and its exhaust gas purifying system 2 of the embodiment. The engine 1 is operated based on a so-called lean combustion in which the air-fuel ratio of the air-fuel mixture is leaner than stoichiometry in a stationary operation state. More specifically, the engine is a diesel engine, a lean burn gasoline engine, or the like.

The exhaust gas purifying system 2 includes a catalyst purifying device 3 which is provided in an exhaust passageway 11 extending from an exhaust gas port of the engine 1 and an electronic control unit (hereinafter, referred to as an "ECU") 6 which controls the engine 1 and the catalyst purifying device 3.

The engine 1 is provided with fuel injection valves that inject a fuel to respective cylinders (not illustrated). An actuator which drives the fuel injection valves is electromagnetically connected to the ECU 6. The air-fuel ratio of the air-fuel mixture of the engine 1 is controlled by adjusting the amount of new air introduced into the cylinder, the amount of the EGR gas introduced into the cylinder through an exhaust gas recirculation device (not illustrated), a fuel injection amount from the fuel injection valve, and the like.

The catalyst purifying device 3 includes an upstream catalyst converter 31, an exhaust gas purifying filter 32, a downstream catalyst converter 33, and a urea water supply device 4. The upstream catalyst converter 31 is provided directly below the engine 1 in the exhaust passageway 11. The downstream catalyst converter 33 is provided at the downstream side of the upstream catalyst converter 31 in the exhaust passageway 11. The exhaust gas purifying filter 32 is provided between the upstream catalyst converter 31 and the downstream catalyst converter 33 in the exhaust passageway 11. The upstream catalyst converter 31 and the downstream catalyst converter 33 are equipped with a catalyst that promotes a reaction for purifying elements such as CO, HC, and NOx included in the exhaust gas of the engine 1.

A catalyst having at least a three-way purification function is used as the upstream catalyst provided in the upstream catalyst converter 31. The three-way purification function indicates a function of causing a three-way purification reaction, that is, a reaction in which oxidizations of HC and CO and a reduction of NOx are performed at the same time under the stoichiometry atmosphere. An oxidation catalyst or a three-way catalyst may be used as an example of a catalyst having such a three-way purification function. An oxidation catalyst or a three-way catalyst is desirably used as the upstream catalyst.

The oxidation catalyst (DOC) highly efficiently purifies HC, CO, and NOx by the three-way purification reaction under the stoichiometry atmosphere. The oxidation catalyst purifies HC, CO, and NOx and produces $NH_3$ under the rich atmosphere. Further, under the lean atmosphere, the oxidation catalyst purifies HC and CO by oxidization and oxidizes a part of NO in the exhaust gas into $NO_2$, so that the NOx purification rate in the downstream catalyst converter 33 to be described later is improved. The three-way catalyst (TWC) corresponds to a catalyst in which an oxygen absorption/release material is added to the oxidation catalyst. The three-way catalyst and the oxidation catalyst basically have the same purification function. However, compared to the oxidation catalyst, the three-way catalyst has an advantage that a three-way purification window is widened due to the oxygen absorption/release material provided therein.

The exhaust gas purifying filter 32 traps the particulate matter in the exhaust gas. In order to remove the deposited particulate matter by combustion at the lower temperature, it is desirable that the exhaust gas purifying filter 32 carry the above-described oxidation catalyst.

The downstream catalyst converter 33 has a selective reduction catalyst (hereinafter, referred to as an "SCR catalyst") which reduces NOx under the presence of $NH_3$.

In the downstream catalyst converter 33, a Fast-SCR reaction (see the following formula (1)), a Standard-SCR reaction (see the following formula (2)), and a Slow-SCR reaction (see the following formula (3)) may occur under the presence of $NH_3$.

$$NO+NO_2+2NH_3 \rightarrow 2N_2+3H_2O \qquad (1)$$

$$4NO+4NH_3+O_2 \rightarrow 4N_2+6H_2O \qquad (2)$$

$$6NO_2+8NH_3 \rightarrow 7N_2+12H_2O \qquad (3)$$

The Fast-SCR reaction is a reaction in which NO and $NO_2$ in the exhaust gas are reduced by $NH_3$ at the same time, and the reaction speed is the fastest among the three kinds of reaction. Accordingly, the Fast-SCR reaction mainly occurs when the ratios of NO and $NO_2$ in the exhaust gas flowing into the downstream catalyst converter 33 become equal to each other, that is, the $NO_2$—NOx ratio becomes an optimal value of about 0.5. For this reason, the NOx purification rate using the downstream catalyst converter 33 becomes the highest. However, since NOx released from the engine 1 includes a large amount of NO, mainly in order to cause the Fast-SCR reaction in the downstream catalyst converter 33, there is a need to oxidize a part of the NO in the exhaust gas into $NO_2$ in the upstream catalyst converter 31 or the exhaust gas purifying filter 32. Accordingly, the amount or the composition of the catalyst of the upstream catalyst converter 31 or the exhaust gas purifying filter 32 is prepared so that the ratio between NO and $NO_2$ of the exhaust gas flowing into the downstream catalyst converter 33 during lean operation to be described later substantially becomes 1:1.

The Slow-SCR reaction is a reaction in which only $NO_2$ in the exhaust gas is reduced by $NH_3$, and the reaction speed thereof is slower than that of the Fast-SCR reaction. When the ratio of $NO_2$ with respect to NO in the exhaust gas flowing into the downstream catalyst converter 33 increases, $NO_2$, the amount of which is excessively increased by the Fast-SCR reaction, is reduced by the Slow-SCR reaction.

The Standard-SCR reaction is a reaction in which only NO in the exhaust gas is reduced by $NH_3$, and the reaction speed thereof is slower than that of the Slow-SCR reaction. As illustrated in the above-described formula (2), $O_2$ is needed only in the Standard-SCR reaction. Accordingly, when the inside of the downstream catalyst converter 33 becomes a stoichiometry atmosphere or a rich atmosphere that substantially does not include oxygen, the Standard-SCR reaction substantially does not occur.

The SCR catalyst has a function of reducing NOx in the exhaust gas by $NH_3$ produced from the urea water, and also has a function of absorbing the produced $NH_3$ by a predetermined amount. In the description below, the amount of $NH_3$ which is stored in the SCR catalyst is defined as an $NH_3$ storage amount and the amount of $NH_3$ which may be stored in the SCR catalyst is defined as the maximum $NH_3$ storage capacity. In this way, $NH_3$ stored in the SCR catalyst is also appropriately consumed for the reduction of NOx in the exhaust gas. For this reason, the SCR catalyst has a characteristic in which the NOx purification rate becomes higher as the $NH_3$ storage amount becomes more.

Furthermore, the SCR catalyst includes zeolite, and also has a function of absorbing $NO_2$, a $NO_2$ compound, and HC in the exhaust gas and storing them by a predetermined amount.

In the description below, the amount of $NO_2$ and a $NO_2$ compound which are stored in the SCR catalyst is defined as a $NO_2$ storage amount, and the amount of $NO_2$ and a $NO_2$ compound which may be stored in the SCR catalyst is defined as a maximum $NO_2$ storage amount.

In the SCR catalyst with such a $NO_2$ absorption function, when the amount of $NO_2$ excessively increases in the inflowing exhaust gas (the $NO_2$—NOx ratio is larger than 0.5), $NO_2$ which is not reduced by the Fast-SCR reaction is absorbed. Then, in this way, $NO_2$ which is stored in the SCR catalyst is released and is reduced by the Fast-SCR reaction along with extra NO when the amount of NO excessively increases in the exhaust gas flowing into the SCR catalyst (the $NO_2$—NOx ratio is smaller than 0.5). That is, even when the $NO_2$—NOx ratio of the inflowing exhaust gas changes from an optimal value so that $NO_2$ or NO excessively increases, the SCR catalyst with the $NO_2$ absorption function absorbs or releases $NO_2$ so that the $NO_2$—NOx ratio is maintained at the optimal value.

Figure 2:
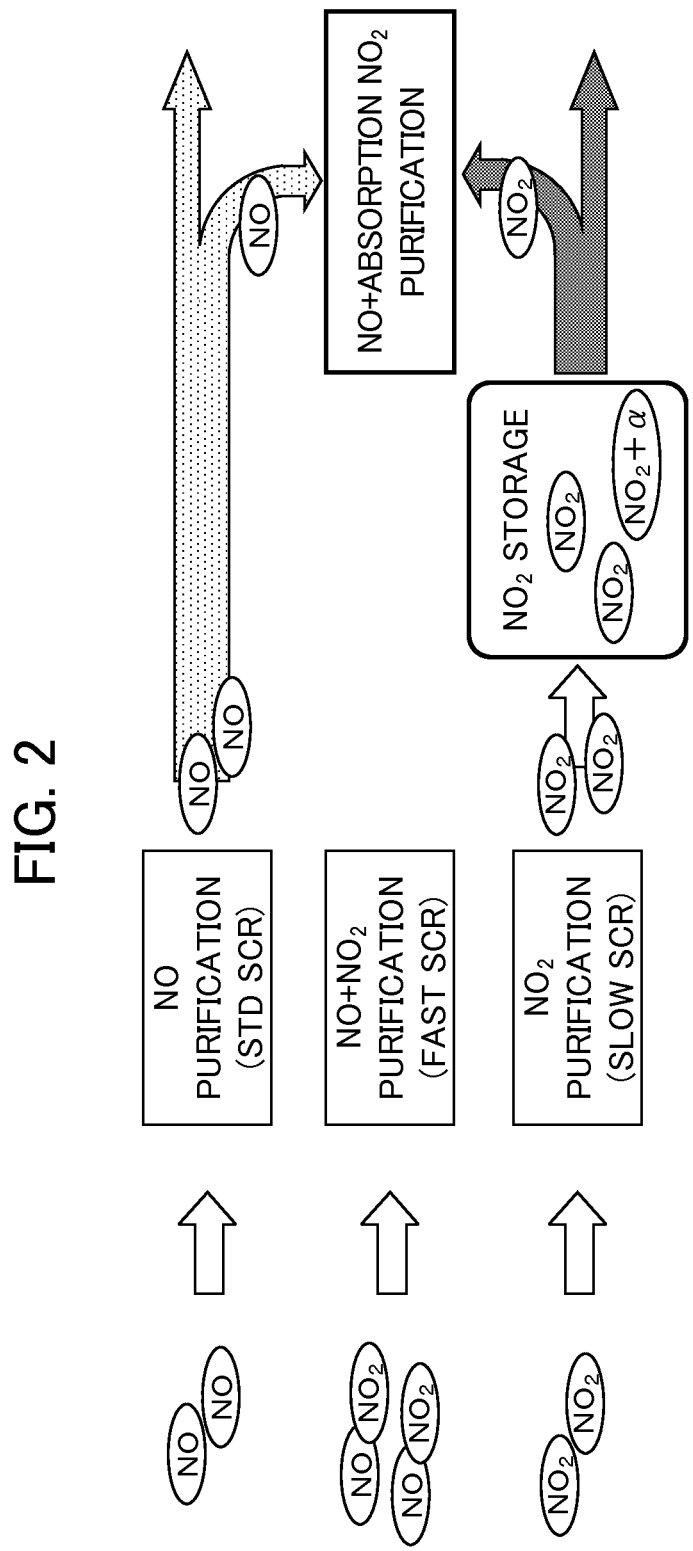
FIG. 2 is a diagram schematically illustrating an SCR catalyst model that is modelled after the purification of NOx and the absorption of $NO_2$ of an SCR catalyst.

FIG. 2 is a diagram schematically illustrating an SCR catalyst model that is modelled after the purification of NOx and the absorption of $NO_2$ by the SCR catalyst.

As described above, in the SCR catalyst which exists under the presence of $NH_3$, the NOx reducing reaction occurs through three kinds of reaction, that is, the Fast, Slow, and Standard reactions, of which the reaction speeds are different from one another. Furthermore, since the SCR catalyst has the ability of absorbing $NO_2$ in the exhaust gas so as to be stored by a predetermined amount, the reaction occurring in the SCR catalyst largely changes in response to the $NO_2$ storage amount and the $NO_2$—NOx ratio of the exhaust gas flowing into the SCR catalyst. In the description below, the reaction which occurs via the SCR catalyst with respect to inflowing NO and $NO_2$ will be separately described by (1) a state where the $NO_2$ storage amount is 0 or the approximately 0, (2) a state where the $NO_2$ storage amount is the maximum $NO_2$ storage capacity or approximately that value, and (3) a state where $NO_2$ is stored at a proper amount in that the $NO_2$ storage amount is sufficiently larger than 0 and is sufficiently smaller than the maximum $NO_2$ storage capacity.

(1) State of $NO_2$ Storage Amount of 0 or Approximately that Value

When the $NO_2$ storage amount is 0 or approximately that value and $NO_2$ is not substantially stored in the SCR catalyst, it is possible to mention that the SCR catalyst has available capacity in the $NO_2$ absorption function, but does not have available capacity in the $NO_2$ release function.

In such a state, when the exhaust gas, in which $NO_2$ is excessively present ($NO_2$—NOx ratio>0.5), flows into the catalyst, the SCR catalyst causes the Fast-SCR reaction so as to reduce NO and $NO_2$ to be equal to NO in amount in the exhaust gas at the same time. Furthermore, since the reaction that reduces extra $NO_2$ is the Slow-SCR reaction in which the reaction speed is relatively slow, the stationary NOx (particularly, $NO_2$) purification rate is low. However, since the $NO_2$ absorption function has available capacity and unreduced $NO_2$ may be absorbed to the SCR catalyst, the transient NOx purification rate is high while $NO_2$ may be absorbed. That is, in this case, the NOx purification rate is maintained high while the $NO_2$ storage amount increases.

Meanwhile, when the exhaust gas, in which NO is excessively present ($NO_2$—NOx ratio<0.5), flows into the catalyst, the SCR catalyst causes the Fast-SCR reaction so as to reduce $NO_2$ and NO to be equal to $NO_2$ in amount in the exhaust gas at the same time. Furthermore, since the reaction that reduces extra NO here is the Standard-SCR reaction of which the reaction speed is relatively slow, the stationary NOx (particularly, NO) purification rate is low. Furthermore, since the $NO_2$ release function does not have available capacity and the amount of the extra NO and the amount of $NO_2$ released from the SCR catalyst become smaller as the Fast-SCR reaction occurs, the transient NOx purification rate is also low.

(2) State of $NO_2$ Storage Amount of Maximum $NO_2$ Storage Capacity or Approximately that Value When the $NO_2$ storage amount is the maximum $NO_2$ storage capacity or approximately that value and $NO_2$ is stored in the SCR catalyst at almost the limit amount, it is possible to mention that the SCR catalyst has available capacity in the $NO_2$ release function, but does not have available capacity in the $NO_2$ absorption function.

In such a state, when the exhaust gas, in which $NO_2$ is excessively present, flows into the catalyst, the SCR catalyst causes the Fast-SCR reaction to reduce NO and $NO_2$ to be equal to NO in amount in the exhaust gas at the same time. Furthermore, the reaction that reduces extra $NO_2$ here is the Slow-SCR reaction of which the reaction speed is relatively slow, the stationary NOx (particularly, $NO_2$) purification rate is low. Furthermore, since the $NO_2$ absorption function does not have available capacity and the unreduced $NO_2$ may not be absorbed to the SCR catalyst, the transient NOx purification rate is low.

Meanwhile, when the exhaust gas, in which NO is excessively present, flows into the catalyst, the SCR catalyst causes the Fast-SCR reaction to reduce $NO_2$ and NO to be equal to $NO_2$ in amount in the exhaust gas at the same time. Furthermore, the reaction that reduces extra NO here is the Standard-SCR reaction of which the reaction speed is relatively slow, the stationary NOx (particularly, NO) purification rate is low. However, since the $NO_2$ release function has available capacity, the ratio in which the extra NO is reduced along with $NO_2$ released from the SCR catalyst by the Fast-SCR reaction is higher than the ratio in which NO alone is reduced by the Standard-SCR reaction. For this reason, the transient NOx purification rate is high while $NO_2$ may be released. That is, in this case, the NOx purification rate is maintained high while the $NO_2$ storage amount decreases.

(3) State of Properly Absorbing $NO_2$

When $NO_2$ is properly absorbed to the SCR catalyst, it is possible to mention that the SCR catalyst has available capacity in both the $NO_2$ absorption function and the $NO_2$ release function.

In such a state, when the exhaust gas, in which $NO_2$ is excessively present, flows into the catalyst, the SCR catalyst causes the Fast-SCR reaction to reduce NO and $NO_2$ to be equal to NO in amount in the exhaust gas at the same time. Furthermore, since the reaction that reduces extra $NO_2$ here is the Slow-SCR reaction of which the reaction speed is relatively slow, the stationary NOx (particularly, $NO_2$) purification rate is low. However, since the $NO_2$ absorption function has available capacity and hence unreduced $NO_2$ may be absorbed to the SCR catalyst, the transient NOx purification rate is high while $NO_2$ may be absorbed. That is, in this case, the NOx purification rate is maintained high while the $NO_2$ storage amount increases.

Meanwhile, when the exhaust gas, in which NO is excessively present, flows into the catalyst, the SCR catalyst causes the Fast-SCR reaction to reduce $NO_2$ and NO to be equal to $NO_2$ in amount in the exhaust gas at the same time. Furthermore, since the reaction that reduces extra NO here is the Standard-SCR reaction of which the reaction speed is relatively slow, the stationary NOx (particularly, NO) purification rate is low. However, since the $NO_2$ release function has available capacity, the ratio in which the extra NO is reduced along with $NO_2$ released from the SCR catalyst by the Fast- SCR reaction is higher than the ratio in which NO alone is reduced by the Standard-SCR reaction. For this reason, the transient NOx purification rate is high while $NO_2$ may be released. That is, in this case, the NOx purification rate is maintained high while the $NO_2$ storage amount decreases.

As described above, the NOx purification characteristic of the SCR catalyst changes in response to the $NO_2$ storage amount. Here, a reaction will be examined which is caused by the SCR catalyst when the air-fuel ratio of the air-fuel mixture is controlled to the stoichiometry. When the air-fuel ratio of the air-fuel mixture is controlled to the stoichiometry, a reaction that oxidizes NO in the exhaust gas into $NO_2$ in the upstream catalyst converter and the exhaust gas purifying filter does not occur since the exhaust gas does not substantially include oxygen. Accordingly, the exhaust gas including an excessively large amount of NO and a small amount of oxygen flows into the SCR catalyst. As described in (2), when the $NO_2$ storage amount of the SCR catalyst is large, the Fast-SCR reaction occurs by using the stored $NO_2$. For this reason, it is possible to mention that the NOx purification performance of the SCR catalyst being under the stoichiometry atmosphere is higher as the $NO_2$ storage amount becomes larger.

Returning to FIG. 1, the urea water supply device 4 includes a urea water tank 41 and a urea water injector 42. The urea water tank 41 stores urea water as a precursor of the reducing agent ($NH_3$) in the SCR catalyst. The urea water tank 41 is connected to the urea water injector 42 through a urea water supply path 43 and a urea water pump (not illustrated). When the urea water injector 42 is driven by an actuator (not illustrated), the urea water injector is opened or closed so as to inject the urea water supplied from the urea water tank 41 toward the upstream side of the downstream catalyst converter 33 inside the exhaust passageway 11. The urea water which is injected from the injector 42 undergoes hydrolytic degradation by $NH_3$ in the exhaust gas or the downstream catalyst converter 33, and is consumed for the reduction of NOx. The actuator of the urea water injector 42 is electromagnetically connected to the ECU 6. The ECU 6 determines the urea water injection amount by the urea water injection control to be described later and drives the urea water injector 42 so that this amount of the urea water is injected.

The ECU 6 is connected with an air-fuel ratio sensor 35, an exhaust gas temperature sensor 36, a $NH_3$ sensor 37, an accelerator opening degree sensor 38, and the like as sensors for detecting the states of the exhaust gas purifying system 2 and the engine 1.

The air-fuel ratio sensor 35 detects the air-fuel ratio (the oxygen concentration) of the exhaust gas circulating between the upstream catalyst converter 31 and the exhaust gas purifying filter 32 in the exhaust passageway 11, and transmits a signal substantially linear to the detection value to the ECU 6. A linear air-fuel ratio sensor (LAF sensor) for outputting a linear signal from the rich air-fuel ratio to the lean air-fuel ratio is used as the air-fuel ratio sensor 35.

The exhaust gas temperature sensor 36 detects the temperature of the exhaust gas circulating between the exhaust gas purifying filter 32 and the downstream catalyst converter 33 in the exhaust passageway 11, and transmits a signal substantially linear to the detection value to the ECU 6. The ECU 6 calculates (acquires) the temperature of the exhaust gas purifying filter 32 or the temperature of the SCR catalyst of the downstream catalyst converter 33 by a process (not illustrated) based on the output of the exhaust gas temperature sensor 36.

The $NH_3$ sensor 37 is provided at the downstream side of the downstream catalyst converter 33 provided with the SCR catalyst in the exhaust passageway 11. The $NH_3$ sensor 37 detects the concentration of $NH_3$ in the exhaust gas at the downstream side of the downstream catalyst converter 33, and transmits a signal substantially linear to the detection value to the ECU 6.

The accelerator opening degree sensor 38 detects the stepping amount of the accelerator pedal, and transmits a signal substantially linear to the detection value to the ECU 6. The value of the request torque of the engine 1 is calculated by a process (not illustrated) in the ECU 6 based on the output of the accelerator opening degree sensor 38.

The ECU 6 includes an input circuit which has a function of trimming input signal waveforms from various sensors, correcting the voltage level to a predetermined level, and converting the analogue signal value into a digital signal value, a central processing unit (hereinafter, referred to as a "CPU"), a storage circuit which stores a calculation result and various calculation programs executed by the CPU, and an output circuit which outputs a control signal to the fuel injection valve of the engine 1, the urea water injector 42 of the urea water supply device 4, and the like.

The ECU 6 is equipped with control blocks of the air-fuel ratio controller 61 which is involved in the execution of the air-fuel ratio control of the engine 1, the urea water controller 62 which is involved in the execution of the urea water injection control using the urea water supply device 4, and the like.

The urea water controller 62 controls the urea water injection amount from the urea water injector 42 based on the output of the $NH_3$ sensor 37 so that $NH_3$ of an amount necessary for reducing NOx is supplied to the downstream catalyst converter 33 and excessive $NH_3$ is not released from the downstream catalyst converter 33. More specifically, the urea water controller 62 determines the urea water injection amount based on the output of the $NH_3$ sensor 37 so that the $NH_3$ storage amount is approximately maintained at the maximum storage capacity while estimating the $NH_3$ storage amount of the SCR catalyst and the maximum $NH_3$ storage capacity. Furthermore, since the detailed algorithm of the above-described urea water injection control is specifically described in, for example, WO 2009/128169 proposed by the present applicant, any more detailed description will not be repeated here.

The air-fuel ratio controller 61 controls the air-fuel ratio of the air-fuel mixture of the engine 1 in a manner such that an appropriate operation mode of the engine 1 is determined and the new air amount, the EGR amount, the fuel injection amount, and the like are adjusted in accordance with the algorithm determined for each operation mode. Two modes, that is, a lean operation mode and a stoichiometry operation mode are set as the operation mode.

In the lean operation mode, the air-fuel ratio controller 61 causes the oxidization reaction of CO and HC in the upstream catalyst converter 31 and the exhaust gas purifying filter 32 and controls the air-fuel ratio of the air-fuel mixture at a value leaner than the stoichiometry so that the NOx reducing reaction steadily occurs in the SCR catalyst of the downstream catalyst converter 33.

In the stoichiometry operation mode, the air-fuel ratio controller 61 controls the air-fuel ratio of the air-fuel mixture to the stoichiometry based on the output of the air-fuel ratio sensor 35 so as to cause the three-way purification reaction of the upstream catalyst converter 31.

The air-fuel ratio controller 61 changes the operation mode of the engine 1 to the lean operation mode in a case of the stationary operation state, and changes the operation mode from the lean operation mode to the stoichiometry operation mode in a case of the acceleration operation state in which the NOx discharge amount increases.

Figure 3:
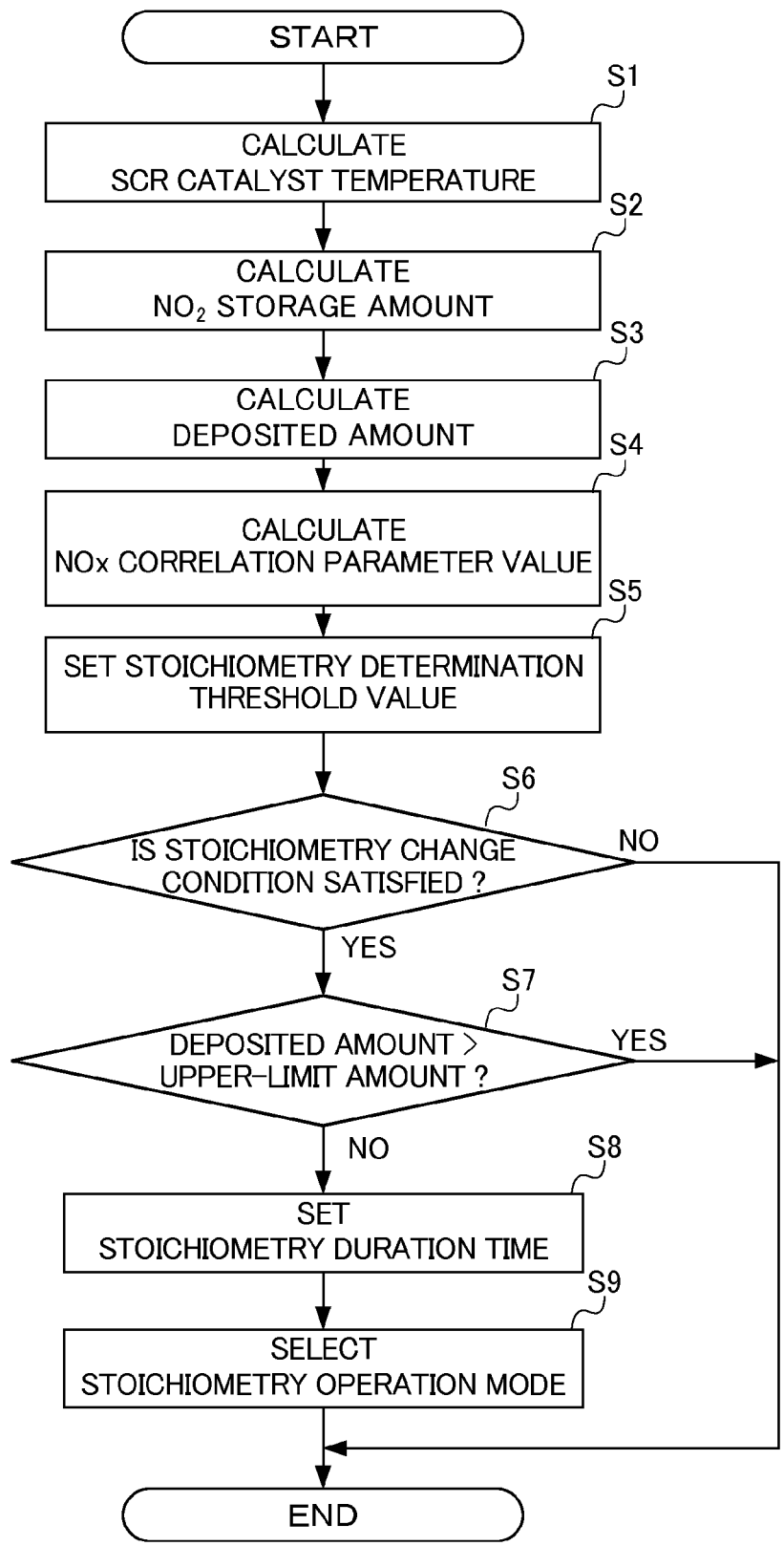
FIG. 3 is a flowchart illustrating a procedure of changing the operation mode of the engine from a lean operation mode to a stoichiometry operation mode.

FIG. 3 is a flowchart illustrating a procedure of changing an operation mode of the engine from a lean operation mode to a stoichiometry operation mode. This process is executed at a predetermined control cycle in the lean operation mode by the air-fuel ratio controller 61. In this process, the air-fuel ratio controller calculates a value of the NOx correlation parameter increasing in response to the NOx discharge amount, and determines whether to change the operation mode from the lean operation mode to the stoichiometry operation mode based on the comparison between the value of the NOx correlation parameter and the stoichiometry determination threshold value.

In S1, the air-fuel ratio controller calculates the temperature of the SCR catalyst of the downstream catalyst converter based on the output of the exhaust gas temperature sensor, and the current routine proceeds to S2.

In S2, the air-fuel ratio controller calculates the $NO_2$ storage amount, and the current routine proceeds to S3. Hereinafter, referring to FIGS. 4 to 6, a procedure of calculating the $NO_2$ storage amount will be described.

Figure 4:
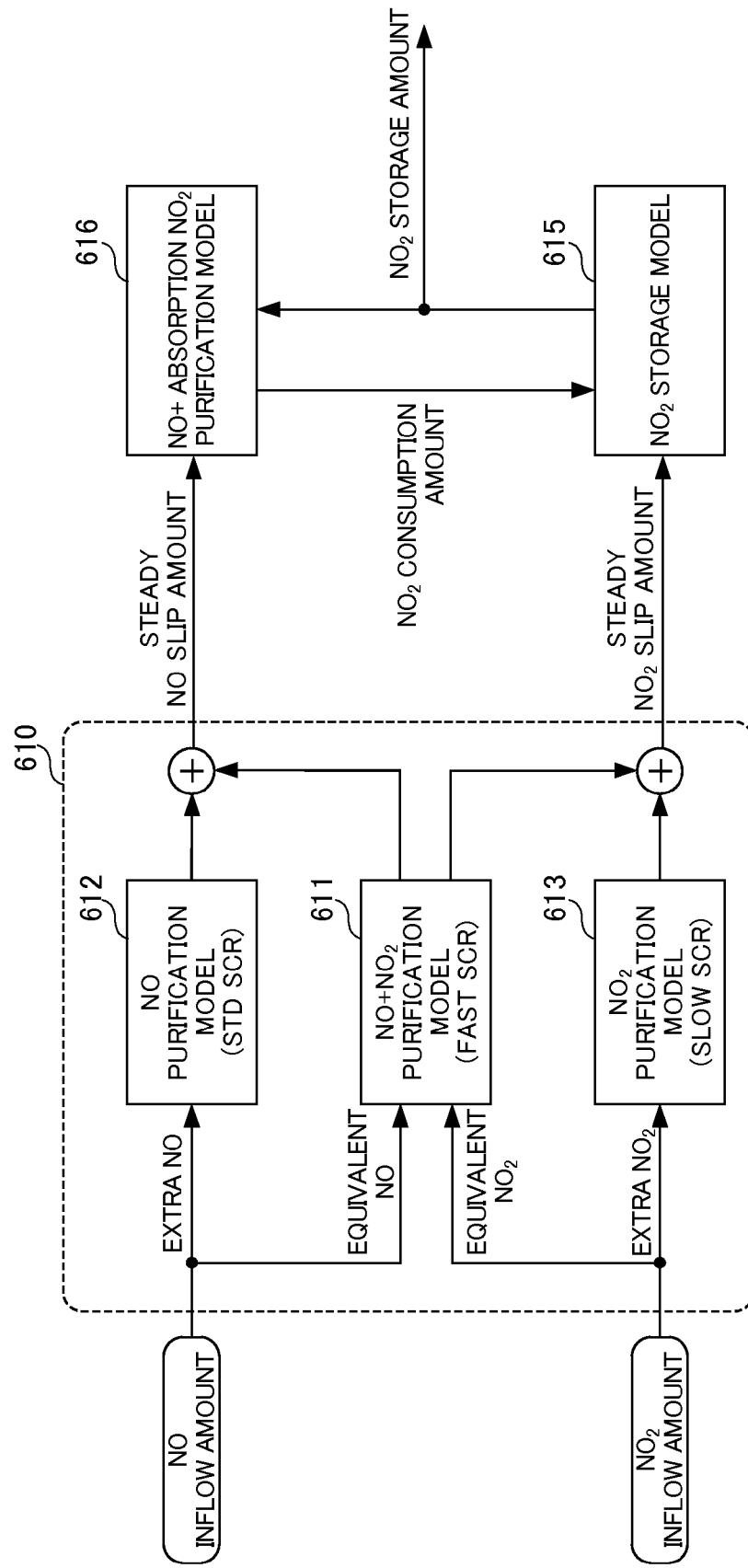
FIG. 4 is a block diagram calculating the $NO_2$ storage amount of an SCR catalyst from a NO inflow amount and a $NO_2$ inflow amount with respect to the SCR catalyst.

FIG. 4 is a block diagram calculating the $NO_2$ storage amount of the SCR catalyst from the NO inflow amount and the $NO_2$ inflow amount with respect to the SCR catalyst. The block diagram shown in FIG. 4 realizes the SCR catalyst model described by referring to FIG. 2, and includes a stationary slip amount calculating unit 610, a $NO_2$ storage model calculating unit 615, and a NO+absorption $NO_2$ purification model calculating unit 616. Here, the NO inflow amount and the $NO_2$ inflow amount with respect to the SCR catalyst are calculated by taking into consideration the NOx purification efficiency and the NO oxidization efficiency of the upstream catalyst converter 31 and the exhaust gas purifying filter 32 with respect to the NO amount and the $NO_2$ amount directly below the engine estimated based on the operation state of the engine.

The stationary slip amount calculating unit 610 calculates the stationary NO slip amount and the stationary $NO_2$ slip amount corresponding to the NO amount and the $NO_2$ amount released from the SCR catalyst when the exhaust gas of the estimated NO inflow amount and the estimated $NO_2$ inflow amount is steadily supplied to the SCR catalyst. That is, the stationary NO slip amount and the stationary $NO_2$ slip amount correspond to the respective slip amounts on the assumption that the SCR catalyst does not have the $NO_2$ absorption function and the $NO_2$ release function.

A stationary NO+$NO_2$ purification model calculating unit 611 calculates the amounts of NO and $NO_2$ which are not reduced and are released among the NO and $NO_2$ flowing into the catalyst based on a predetermined map on the assumption that only the Fast-SCR reaction occurs in the SCR catalyst.

A stationary NO purification model calculating unit 612 calculates the amount of NO which is not reduced and is released among the NO flowing into the catalyst based on a predetermined map on the assumption that only the Standard-SCR reaction occurs in the SCR catalyst.

A stationary $NO_2$ purification model calculating unit 613 calculates the amount of $NO_2$ which is not reduced and is released among the $NO_2$ flowing into the catalyst based on a predetermined map on the assumption that only the Slow-SCR reaction occurs in the SCR catalyst.

On the assumption that the Fast-SCR reaction occurs in all elements which are small in content among the NO and $NO_2$ flowing into the catalyst, the stationary slip amount calculating unit 610 divides the estimated NO inflow amount and the estimated $NO_2$ inflow amount into a fraction (equivalent NO and equivalent $NO_2$) to be subjected to the Fast-SCR reaction, a fraction (extra NO) to be subjected to the Standard-SCR reaction, and a fraction (extra $NO_2$) to be subjected to the Slow-SCR reaction, and inputs the respective results to the stationary purification model calculating units 611, 612, and 613. Furthermore, on the assumption that the Fast-SCR reaction occurs in all elements which are small in content among the NO and $NO_2$ flowing into the catalyst, any one of extra NO and extra $NO_2$ becomes 0.

Then, the stationary slip amount calculating unit 610 sets the sum of the NO slip amounts calculated by the stationary purification model calculating units 611 and 612 as a stationary NO slip amount, and sets the sum of the $NO_2$ slip amounts calculated by the model calculating units 611 and 613 as a stationary $NO_2$ slip amount.

The $NO_2$ storage model calculating unit 615 calculates the $NO_2$ storage amount corresponding to the $NO_2$ storage amount of the SCR catalyst, and the NO+absorption $NO_2$ purification model calculating unit 616 calculates the $NO_2$ consumption amount corresponding to the amount of the $NO_2$ which is consumed by the Fast-SCR reaction along with the NO flowing into the SCR catalyst among $NO_2$ stored in the SCR catalyst.

The $NO_2$ storage model calculating unit 615 sets the amount of $NO_2$ (the new $NO_2$ absorption amount) newly absorbed to the SCR catalyst among the stationary $NO_2$ slip amount estimated by the stationary slip amount calculating unit 610 as a positive value, sets the $NO_2$ consumption amount estimated by the NO+absorption $NO_2$ purification model calculating unit 616 as a negative value, and sets the integration of the new $NO_2$ absorption amount and the $NO_2$ consumption amount as the $NO_2$ storage amount.

Figure 5:
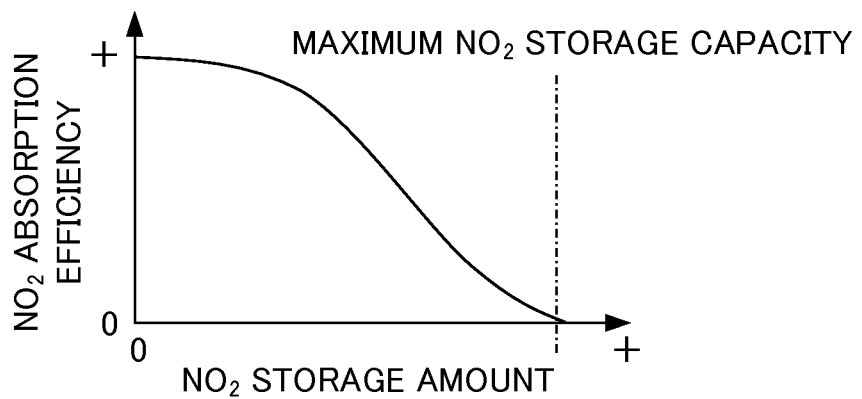
FIG. 5 is a diagram illustrating an example of a map for determining $NO_2$ absorption efficiency.

Here, the new $NO_2$ absorption amount is calculated by multiplying the stationary $NO_2$ slip amount by the $NO_2$ absorption efficiency which is determined by searching in the map (see FIG. 5). Further, the $NO_2$ slip amount is calculated by subtracting the new $NO_2$ absorption amount from the stationary $NO_2$ slip amount.

FIG. 5 is a diagram illustrating an example of a map for determining $NO_2$ absorption efficiency.

As illustrated in FIG. 5, the $NO_2$ absorption efficiency, corresponding to the ratio of $NO_2$ absorbed to the SCR catalyst among the inflowing $NO_2$, decreases as the $NO_2$ storage amount increases. That is, the $NO_2$ absorption function of the SCR catalyst is degraded as the $NO_2$ storage amount increases. Furthermore, the maximum $NO_2$ storage capacity corresponding to the upper limit value of the $NO_2$ storage amount is defined as the $NO_2$ storage amount in which the $NO_2$ absorption efficiency becomes approximately 0 in the map shown in FIG. 5.

Returning to FIG. 4, the NO+absorption $NO_2$ purification model calculating unit 616 calculates the amount of NO (the NO reduction amount) which is reduced by the Fast-SCR reaction along with $NO_2$ stored in the SCR catalyst among the stationary NO slip amount estimated by the stationary slip amount calculating unit 610, that is, the amount of NO which is not reduced and is directly released on the assumption that the SCR catalyst does not have the NO release function.

Figure 6:
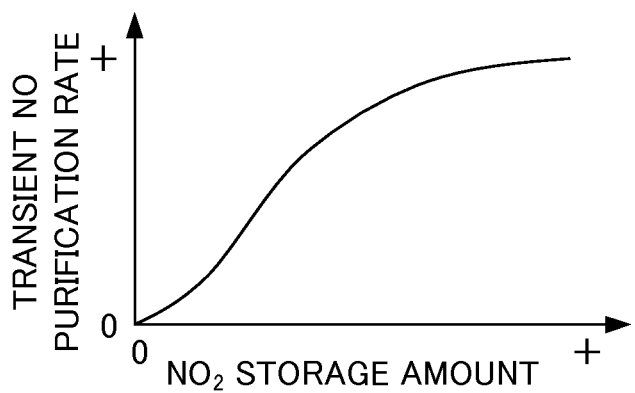
FIG. 6 is a diagram illustrating an example of a map for determining a transient NOx purification rate.

Here, the NO reduction amount is calculated by multiplying the stationary NO slip amount by the transient NO purification rate determined by searching in a map (see FIG. 6). Furthermore, the NO slip amount is calculated by subtracting the NO reduction amount from the stationary NO slip amount, and the $NO_2$ consumption amount is calculated as the amount of $NO_2$ which is reduced along with NO of the NO reduction amount by the Fast-SCR reaction.

FIG. 6 is a diagram illustrating an example of a map for determining the transient NOx purification rate.

The transient NO purification rate corresponding to the ratio of NO which is reduced along with $NO_2$ released from the SCR catalyst among the inflowing NO decreases as the $NO_2$ storage amount increases. That is, the $NO_2$ release function of the SCR catalyst is degraded as the $NO_2$ storage amount increases.

Returning to FIG. 3, in S3, the air-fuel ratio controller calculates the particulate matter deposited amount of the exhaust gas purifying filter, and the current routine proceeds to S4. Here, the particulate matter deposited amount is calculated by a known method such as the estimation based on the integration of the fuel injection amount or the estimation based on a differential pressure sensor (not illustrated).

In S4, the air-fuel ratio controller calculates the value of the NOx correlation parameter, and the current routine proceeds to S5. For example, the request torque of the engine is used as the NOx correlation parameter. A parameter which increases in proportion to the NOx discharge amount from the engine is used as another NOx correlation parameter, and an example of this parameter includes the mean effective pressure calculated from the output of the cylinder internal pressure sensor (not illustrated), the estimation value of the NOx discharge amount, or the like.

In S5, the air-fuel ratio controller sets the stoichiometry determination threshold value, and the current routine proceeds to S6. Hereinafter, referring to FIGS. 7 to 9, a procedure of setting a stoichiometry determination threshold value will be described.

Figure 7:
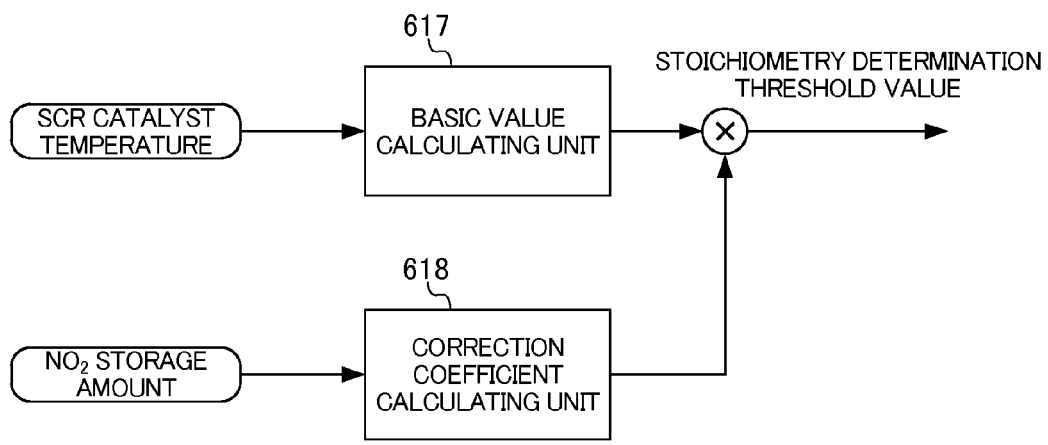
FIG. 7 is a block diagram concerning the setting of a stoichiometry determination threshold value.

FIG. 7 is a block diagram involved in setting the stoichiometry determination threshold value. As illustrated in FIG. 7, the stoichiometry determination threshold value is determined by multiplying the value of the correction coefficient calculated by searching in a predetermined map (see FIG. 9) in a correction value calculating unit 618 by the basic value calculated by searching in a predetermined map (see FIG. 8) in a basic value calculating unit 617.

Figure 8:
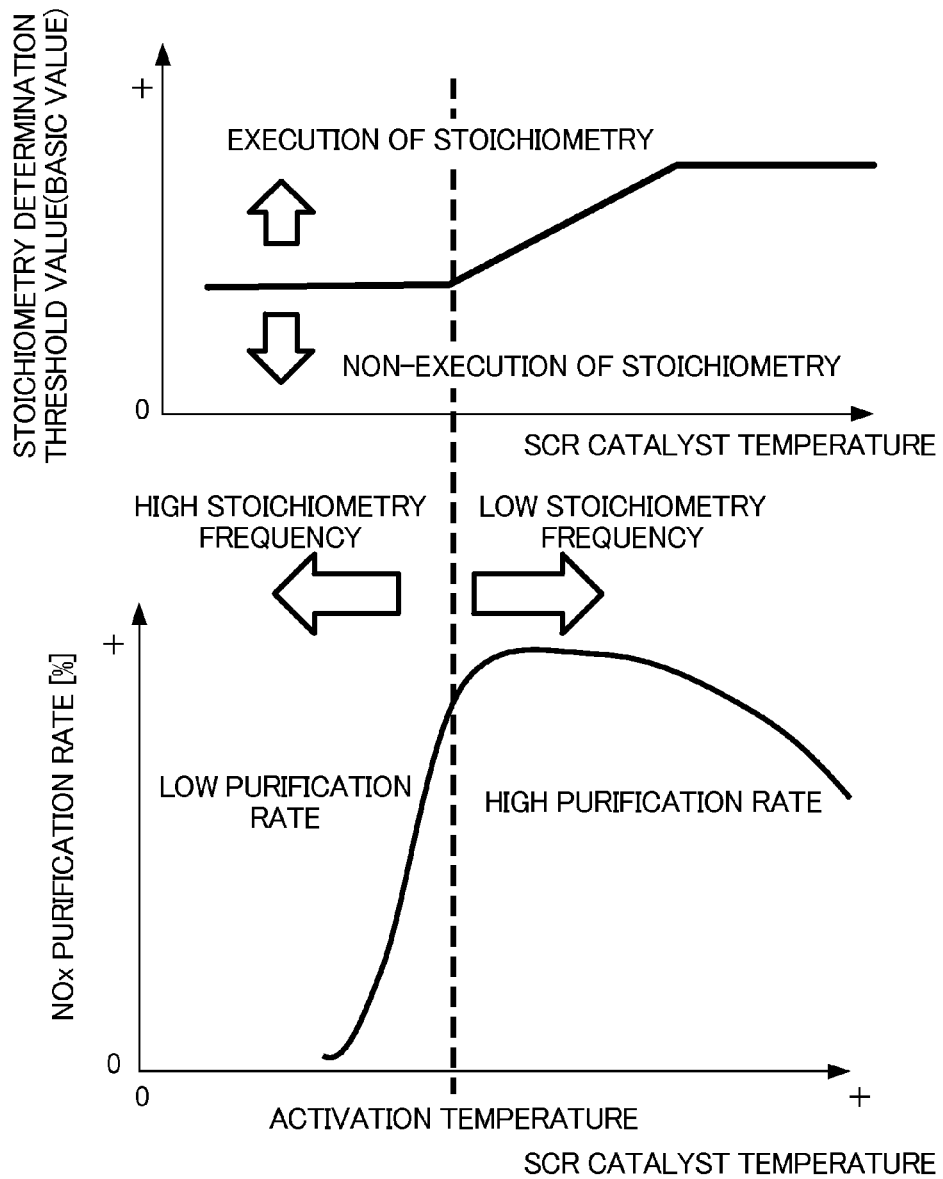
FIG. 8 is a diagram illustrating an example of a map for determining a basic value of the stoichiometry determination threshold value.

FIG. 8 is a diagram illustrating an example of a map for determining the basic value of the stoichiometry determination threshold value. More specifically, FIG. 8 is a map for determining the basic value by using the SCR catalyst temperature calculated in S1 as an input parameter.

As illustrated in the lower stage of FIG. 8, when the temperature of the SCR catalyst is lower than the activation temperature, the NOx purification rate is degraded compared to the case where the temperature of the SCR catalyst is higher than the activation temperature. That is, when the SCR catalyst temperature is lower than the activation temperature, in many cases, it is desirable to purify NOx using the three-way purification reaction of the upstream catalyst compared to a case where the SCR catalyst is mainly used to purify NOx. That is, when the SCR catalyst temperature is lower than the activation temperature, it is desirable to easily change the lean operation mode to the stoichiometry operation mode compared to a case where the SCR catalyst temperature is higher than the activation temperature. In consideration of the temperature characteristic of the SCR catalyst, as illustrated in FIG. 8, the basic value of the stoichiometry determination threshold value is set to a small value when the SCR catalyst temperature is lower than the activation temperature compared to the case where the SCR catalyst temperature is higher than the activation temperature.

Figure 9:
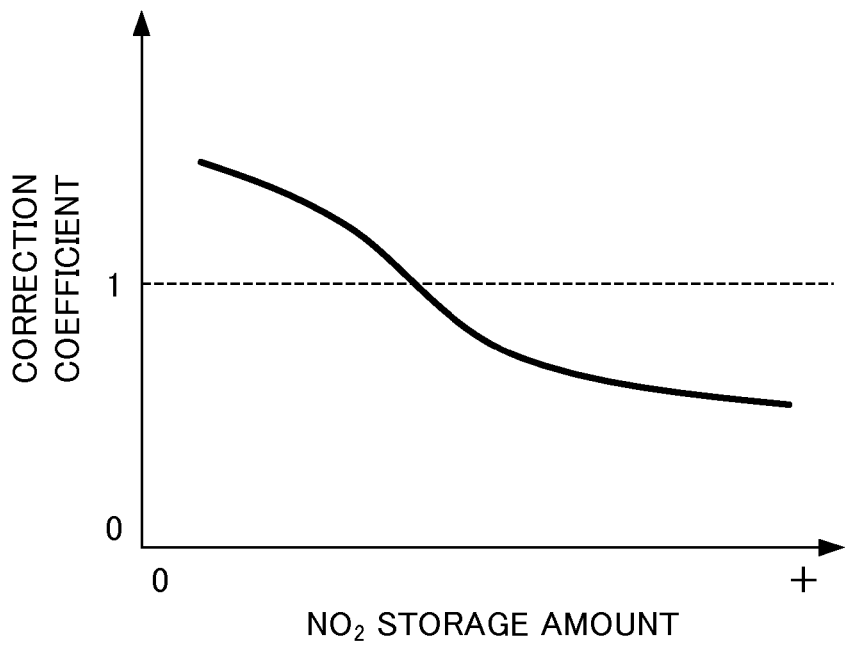
FIG. 9 is a diagram illustrating an example of a map for determining a value of a correction coefficient of the stoichiometry determination threshold value.

FIG. 9 is a diagram illustrating an example of a map for determining the value of the correction coefficient of the stoichiometry determination threshold value. More specifically, FIG. 9 is a map for determining the value of the correction coefficient by using the $NO_2$ storage amount as an input parameter.

As described above, when the $NO_2$ storage amount increases, the NOx purification rate of the SCR catalyst increases under the stoichiometry atmosphere. In consideration of the $NO_2$ absorption characteristic of the SCR catalyst, as illustrated in FIG. 9, the correction coefficient is set to a small value as the $NO_2$ storage amount increases.

Returning to FIG. 3, in S6, the air-fuel ratio controller determines whether the condition of changing the lean operation mode to the stoichiometry operation mode is satisfied. More specifically, the air-fuel ratio controller compares the value of the NOx correlation parameter calculated in S4 with the stoichiometry determination threshold value set in S5, determines that the change condition is satisfied when the value of the NOx correlation parameter is larger than the stoichiometry determination threshold value, and the current routine proceeds to next step S7. Then, when the value of the NOx correlation parameter is the stoichiometry determination threshold value or less, this process ends instead of changing the operation mode from the lean operation mode.

In S7, the air-fuel ratio controller determines whether the particulate matter deposited amount calculated by S3 is larger than a predetermined upper-limit depositing amount. Since the temperature of the exhaust gas increases when the operation mode is changed from the lean operation mode to the stoichiometry operation mode, there is a case in which the particulate matter deposited on the exhaust gas purifying filter is burned. Accordingly, when the operation mode is changed to the stoichiometry operation mode while the particulate matter is excessively deposited on the exhaust gas purifying filter, there is a case in which the temperature of the exhaust gas purifying filter may excessively increase. The upper-limit depositing amount is set to a value in which the temperature of the filter does not reach the excessive temperature when the stoichiometry operation mode is selected. Accordingly, in S7, when the deposited amount is larger than the upper-limit depositing amount, the air-fuel ratio controller determines that the temperature of the filter may reach the excessive temperature, and ends this process instead of proceeding to next step S8 in order to prohibit the change of the operation mode. Furthermore, when the deposited amount is the upper-limit depositing amount or less, the current routine proceeds to next step S8.

In S8, the air-fuel ratio controller determines the stoichiometry duration time corresponding to the continuous execution time of the stoichiometry operation mode by searching in a predetermined map (see FIG. 10) based on the particulate matter deposited amount calculated in S3, and the current routine proceeds to S9.

Figure 10:
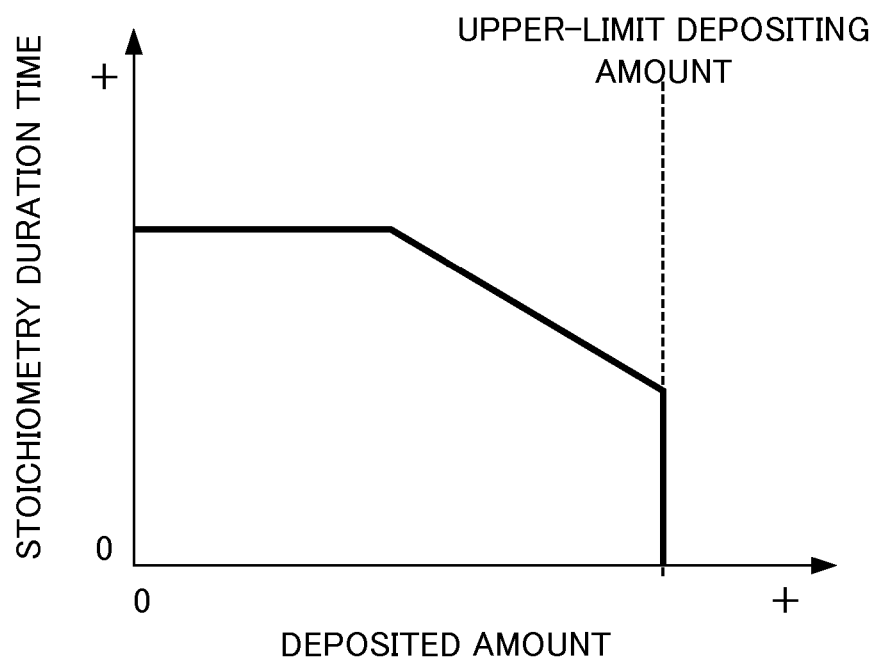
FIG. 10 is a diagram illustrating an example of a map for determining a stoichiometry duration time.

FIG. 10 is a diagram illustrating an example of a map for determining the stoichiometry duration time. More specifically, FIG. 10 is a map for determining the stoichiometry duration time by using the deposited amount of the particulate matter as an input parameter.

More particulate matter is discharged in the stoichiometry operation mode compared to the lean operation mode. Accordingly, as illustrated in FIG. 10, the stoichiometry duration time is set to be shortened as the deposited amount increases in order to ensure the available depositing capacity of the exhaust gas purifying filter.

Returning to FIG. 3, in S9, the air-fuel ratio controller changes the operation mode from the lean operation mode to the stoichiometry operation mode. Furthermore, when the stoichiometry duration time determined in S8 elapses from the time point, the air-fuel ratio controller changes the operation mode from the stoichiometry operation mode to the lean operation mode again.

According to the exhaust gas purifying system 2 of the embodiment, the following effects may be obtained.

(A) According to the embodiment, NOx may be purified by both the upstream catalyst and the SCR catalyst even when the air-fuel ratio is controlled from the lean side to the stoichiometry. Furthermore, the NOx purification rate under the stoichiometry atmosphere may be improved as the $NO_2$ storage amount of the SCR catalyst increases. For this reason, in the embodiment, the stoichiometry determination threshold value is set to a small value as the $NO_2$ storage amount increases, and hence the air-fuel ratio is actively changed to the stoichiometry. Thus, according to the embodiment, the operation mode may be changed from the lean operation mode to the stoichiometry operation mode at an appropriate timing so that the NOx purification rate of the SCR catalyst is not degraded.

(B) In the embodiment, when the value of the NOx correlation parameter is the stoichiometry determination threshold value or less and NOx may be sufficiently purified only by the NOx reducing reaction of the SCR catalyst without using the three-way purification reaction of the upstream catalyst, the lean operation mode is maintained without changing the operation mode to the stoichiometry operation mode. Therefore, it is possible to suppress the degradation of the fuel efficiency due to the change of the air-fuel ratio to the stoichiometry more than necessary.

(C) In the embodiment, when the SCR catalyst temperature is lower than the activation temperature, the stoichiometry determination threshold value is set to a small value compared to a case where the SCR catalyst temperature is higher than the activation temperature, and the air-fuel ratio is actively changed to the stoichiometry. Accordingly, the NOx purification performance of the entire system may be improved by causing the three-way purification reaction of the upstream catalyst at an appropriate time.

(D) In the embodiment, since the stoichiometry duration time is shortened as the deposited amount of the particulate matter increases, the available depositing capacity of the exhaust gas purifying filter may be ensured, and the excessive temperature of the exhaust gas purifying filter may be prevented.

(E) According to the embodiment, since the operation mode is not set to the stoichiometry operation mode when the deposited amount is larger than the upper-limit depositing amount, it is possible to prevent the excessive temperature of the exhaust gas purifying filter.

What is claimed is:

1. An exhaust gas purifying system of an internal combustion engine comprising:
   a selective reduction catalyst which is provided in an exhaust passageway of an internal combustion engine and has a function of reducing NOx under the presence of NH3 and absorbing any one of or both NO2 and a NO2 compound in the exhaust gas;
   a reducing agent supply device which supplies NH3 or its precursor to the selective reduction catalyst;
   an upstream catalyst which is provided at the upstream side of the selective reduction catalyst in the exhaust passageway and has a three-way purification function;
   a NOx correlation value calculating unit which calculates the value of a NOx correlation parameter that increases in response to the NOx discharge amount of the engine;
   an air-fuel ratio control unit which controls an air-fuel ratio of an air-fuel mixture to stoichiometry when the value of the NOx correlation parameter is larger than a stoichiometry determination threshold value;
   a NO2 storage amount estimating unit which calculates an NO2 storage amount corresponding to the amount of NO2 and a NO2 compound absorbed to the selective reduction catalyst; and
   a threshold value setting unit which sets the stoichiometry determination threshold value to a smaller value as the NO2 storage amount increases.

2. The exhaust gas purifying system of an internal combustion engine according to claim 1,
   wherein the air-fuel ratio control unit controls the air-fuel ratio of the air-fuel mixture at a value leaner than stoichiometry so that a NOx reducing reaction steadily occurs in the selective reduction catalyst when the value of the NOx correlation parameter is the stoichiometry determination threshold value or less.

3. The exhaust gas purifying system of an internal combustion engine according to claim 2, further comprising:
   a temperature acquiring unit which acquires a temperature of the selective reduction catalyst,
   wherein when the temperature of the selective reduction catalyst is lower than an activation temperature thereof, the threshold value setting unit sets the stoichiometry determination threshold value to a small value compared to the case where the temperature of the selective reduction catalyst is higher than an activation temperature thereof.

4. The exhaust gas purifying system of an internal combustion engine according to claim 3,
   wherein the exhaust passageway is provided with a filter which traps particulate matter in the exhaust gas, and
   wherein the air-fuel ratio control unit shortens the time in which the air-fuel ratio of the air-fuel mixture is maintained at stoichiometry as the deposited amount of the particulate matter of the filter increases.

5. The exhaust gas purifying system of an internal combustion engine according to claim 4,
   wherein the air-fuel ratio control unit prohibits the control of the air-fuel ratio to stoichiometry in a case where the deposited amount of the particulate matter of the filter is larger than an upper-limit depositing amount that is set to prevent an excessive temperature of the filter when the air-fuel ratio of the air-fuel mixture is controlled to stoichiometry.

6. The exhaust gas purifying system of an internal combustion engine according to claim 1, further comprising:
   a temperature acquiring unit which acquires the temperature of the selective reduction catalyst,
   wherein when the temperature of the selective reduction catalyst is lower than an activation temperature thereof, the threshold value setting unit sets the stoichiometry determination threshold value to a small value compared to the case where the temperature of the selective reduction catalyst is higher than the activation temperature thereof.

7. The exhaust gas purifying system of an internal combustion engine according to claim 1,
   wherein the exhaust passageway is provided with a filter which traps particulate matter in the exhaust gas, and
   wherein the air-fuel ratio control unit shortens a time in which the air-fuel ratio of the air-fuel mixture is maintained at stoichiometry as a deposited amount of the particulate matter of the filter increases.

8. The exhaust gas purifying system of an internal combustion engine according to claim 7, wherein the air-fuel ratio control unit prohibits the control of the air-fuel ratio to stoichiometry in a case where a deposited amount of particulate matter of the filter is larger than an upper-limit depositing amount that is set to prevent an excessive temperature of the filter when the air-fuel ratio of the air-fuel mixture is controlled to stoichiometry.

9. The exhaust gas purifying system of an internal combustion engine according to claim 2,
wherein the exhaust passageway is provided with a filter which traps particulate matter in the exhaust gas, and
wherein the air-fuel ratio control unit shortens a time in which the air-fuel ratio of the air-fuel mixture is maintained at the stoichiometry as a deposited amount of the particulate matter of the filter increases.

10. The exhaust gas purifying system of an internal combustion engine according to claim 9,
wherein the air-fuel ratio control unit prohibits the control of the air-fuel ratio to the stoichiometry in a case where the deposited amount of the particulate matter of the filter is larger than an upper-limit depositing amount that is set to prevent an excessive temperature of the filter when the air-fuel ratio of the air-fuel mixture is controlled to stoichiometry.

11. The exhaust gas purifying system of an internal combustion engine according to claim 6,
wherein the exhaust passageway is provided with a filter which traps particulate matter in the exhaust gas, and
wherein the air-fuel ratio control unit shortens a time in which the air-fuel ratio of the air-fuel mixture is maintained at stoichiometry as a deposited amount of the particulate matter of the filter increases.

12. The exhaust gas purifying system of an internal combustion engine according to claim 11,
wherein the air-fuel ratio control unit prohibits the control of the air-fuel ratio to stoichiometry in a case where a deposited amount of particulate matter of the filter is larger than an upper-limit depositing amount that is set to prevent an excessive temperature of the filter when the air-fuel ratio of the air-fuel mixture is controlled to stoichiometry.

\* \* \* \* \*